BUD K. BEAVER
WILLIAM S. BURLEM
INVENTORS

BUD K. BEAVER
WILLIAM S. BURLEM
INVENTORS

United States Patent Office 3,437,252
Patented Apr. 8, 1969

3,437,252
SOLDER WIRE FEED MECHANISM
Bud K. Beaver, 1040 Alameda Blvd., and William S. Burlem, 1700 Miguel Ave., both of Coronado, Calif. 92118
Filed Feb. 20, 1967, Ser. No. 624,640
Int. Cl. B23k 3/06
U.S. Cl. 228—53    8 Claims

ABSTRACT OF THE DISCLOSURE

In a solder wire feed apparatus to control the supply of solder to the tip of electrically heated solder guns, a flexible tension member is connected between a trigger and a solder feed tube such that depression of the trigger moves the solder into the heated tip of the gun and release of the trigger withdraws the solder a predetermined distance from the tip.

BACKGROUND OF THE INVENTION

Field of the invention

This invention relates to electric soldering tools and more particularly to means for feeding solder wire to the electrically heated tip.

Prior art

In the field of soldering tools, significant effort has been made to furnish the trade with tools which incorporate means to feed solder wire to the heated tip. In all cases, the end objective has been to control the application of the solder wire with the same hand which controls the basic soldering tool, thereby freeing the opposite hand to position and control the work pieces. Luke, Gustaffson, Hongo and Nualty (et al.) have made contributions in this field as evidenced by U.S. Patents Nos.: 3,097,286; 2,952,763; 3,031,562; and 2,604,571 respectively. A significant shortcoming of these and other devices resides in the fact that they utilize levers or gears to accomplish the objective.

The incorporation of levers or gears to provide the automatic feed feature, while still retaining the desired level of electrical power output, results in configurations which are considerably heavier, larger and more complex than conventional, nonautomatic feed tools. In tools similar to the Hongo construction, overall size and weight are retained within conventional limits by reducing the size of the transformer. However, this results in a substantial reduction of transformer power output and a lower temperature at the soldering tip.

SUMMARY OF THE INVENTION

Whereas the prior art has relied principally upon levers or gears to translate trigger motion into solder motion, the present invention couples these motions by the use of a flexible tension member. This coupling feature permits the construction of electric soldering guns which, for the same power ratings, are smaller in size, lighter in weight and simpler in construction by virtue of having fewer parts. The flexible tension member can take the form of a wire, a light cable, or even a cord of a selected material. We prefer to use a light steel cable.

Several novel features of the present invention also are inherent in the concentric tubes which feed and retract the solder wire:

(1) Both tubes exert radial forces on the solder which, for given solder gages, are constant and approximately equal. In the feed stroke, the axial force exerted on the solder by the feed tube teeth is greater than the opposing axial force exerted on the solder by the restraint tube teeth. After the soldering operation is completed and the solder is retracted from the tip by a predetermined amount, the converse is true. Namely, the greater axial force on the solder is produced by the teeth of the restraint tube. This inherent translation of equal radial to unequal axial forces permits the mechanism to function, as described later, without reliance upon any forces, or components thereof, from any structures other than the concentric tubes themselves. It also will be noted that motion of the restraint tube is not dependent upon physical contact with the feed tube, their motions being coupled only by the solder wire.

(2) Since the teeth and tines of the feed tube are completely encompassed within the restraint tube, the teeth of both tubes can grip the solder uniformly around the solder circumference. This results in having the solder positively positioned with respect to the tubes, and thereby to the soldering tip. In addition, gripping the solder uniformly around the circumference with the teeth of both tubes maximizes the contact area between the teeth and the solder, resulting in more positive relative axial forces.

(3) Due to the flexibility of the tines on the concentric tubes, and the encirclement of the solder by the teeth of each, the mechanism can accommodate solder of varying gages and surface irregularities without losing positive control of the solder.

(4) Since the solder is grasped at a point nearest the soldering tip, the maximum amount of the solder contained in the tool may be used before reloading.

Solder for the mechanism may be any of several gages and supplied in conventional roll form or packaged in straight lengths tailored specifically to fit the mechanism. The solder need not be perfectly straight, the mechanism being able to accommodate solder with significant distortions.

For various positions of the trigger, the relative positions of other components in the mechanism are denoted by letters of the alphabet. When a double letter (such as AB) is shown for a given location of a given component, this indicates that the component is in that location for two trigger positions, A and B.

Figures 1, 2:
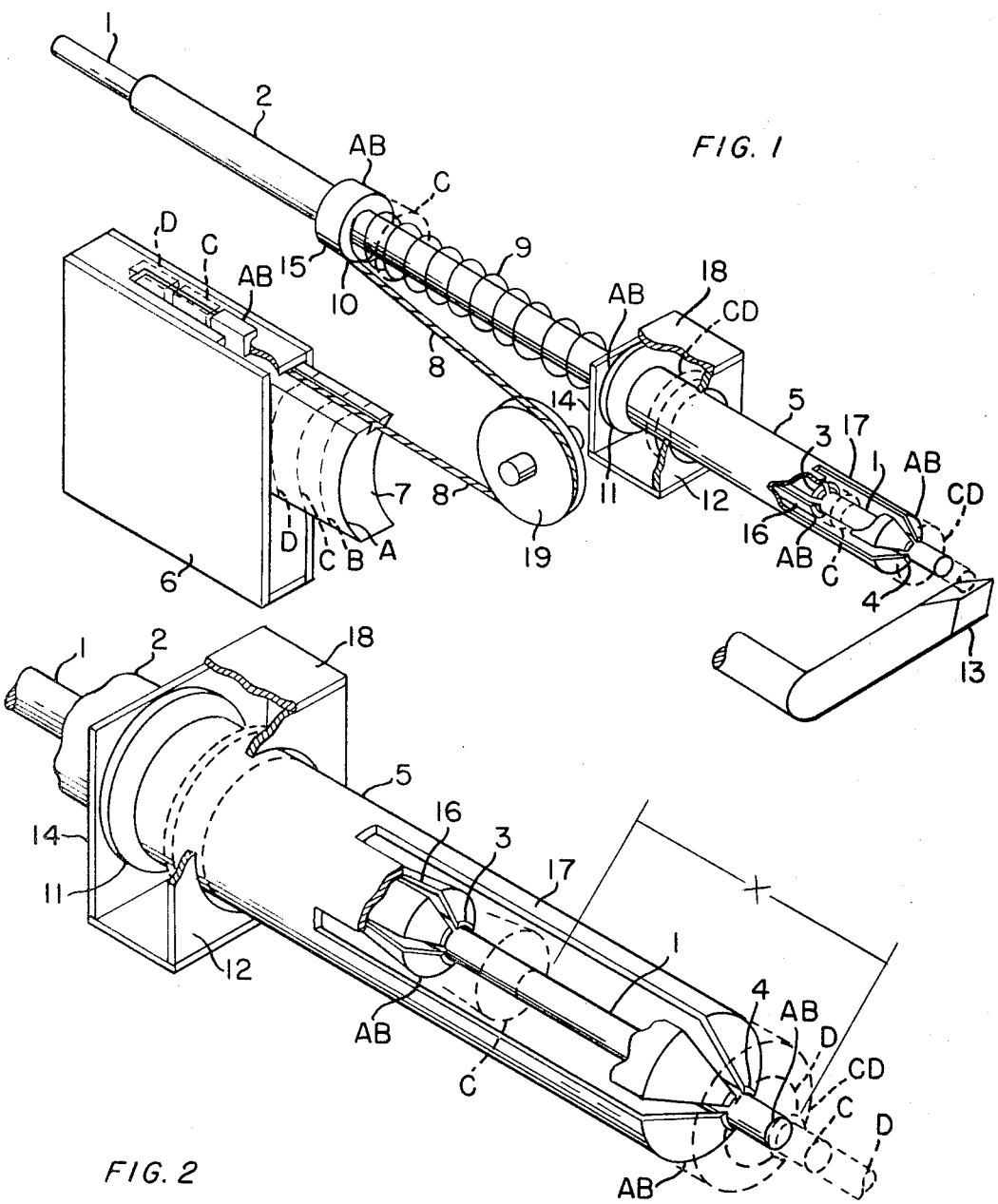
FIGURE 1 is a perspective view of our novel feed mechanism without the conventional heating portions used in association therewith.
FIGURE 2 is a perspective view of the solder grasping portions thereof.

Referring now to FIGURE 1: The solder 1 is fed into the rear of the feed tube 2 and pushed forward until it slides through the teeth 3 on the tines 16 of the feed tube and emerges slightly from between the teeth 4 on the restraint tube 5. If fed from a solder roll, the solder is then cut at the rear of the feed tube. The mechanism is now loaded and ready for use.

The trigger switch 6 is a dual-purpose device with any one of several conventional or conceivable features which permit the heating circuit to be electrically energized without initiating the solder feeding cycle. When the trigger 7 is partially depressed from its rest position A to position B, electrical contact is made and the soldering tip is heated. With the trigger in this partially depressed position, the tool can be used for soldering, desoldering, smoothing, or cutting in the conventional manner.

A flexible tension member 8 has one end attached to the trigger and is then diverted over a guide 19. Such guide is preferably a sheave or pulley wheel. Attached to the opposite end of the flexible member is feed tube 2 at the point 10. When the trigger is depressed beyond position B, these feeding means are actuated. Trigger force creates a tensile force in the flexible tension member which transmits the force to the fed tube and causes the feed tube to move forward, by overcoming the force in the return spring 19, towards the soldering tip a distance proportional to the trigger depression beyond position B.

As shown enlarged for clarity in FIGURE 2, the solder 1 inside the feed tube is grasped by means of the teeth 3 on the tines of the feed tube and moves forward with the feed tube. The restraint tube 5 is concentric with and larger in diameter than the feed tube. The restraint tube is pushed forward by the solder due to the engagement of the teeth 4 on the tines 17 of the restraint tube with the solder. After moving a predetermined distance to position CD, the restraint tube is contrained from further forward motion by the flange 11, integral with the restraint tube, coming into contact with the front wall 12 of the flange housing 18, said flange housing being rigidly affixed to the tool.

The teeth on the tines of both tubes exert a force upon the solder perpendicular to the solder axis due to deflection of the tines outwardly when the solder is originally inserted. The teeth on the tines are configured so that, with approximately equal perpendicular forces, less axial force is required to move the solder through the tubes toward the tip than is required to move the solder rearward through the tubes. Therefore, moving the feed tube toward the tip, while restricting movement of the restraint tube, will cause the solder to move forward through the restraint tube teeth rather than rearward relative to the feed tube teeth. Depression of the trigger beyond position C thusly causes the feed tube to push the solder through the now stationary restraint tube and towards the soldering tip 13 where soldering action is initiated. As much solder as is required for the joint is fed to the soldering tip by continued depression of the trigger to the point where the trigger bottoms (position D). A length of solder designated X on FIGURE 2 is available for feeding to the tip after coming into initial contact with the tip. In addition to providing an axial force upon the solder through the teeth, the ability of the tube tines to flex outwardly from an initial position, where the tips of the teeth are nearly touching, allows for accommodaion of solder of varying gages and renders the mechanism insensitive to irregularities in the solder, such as hardness and deformation.

Referring again to FIGURE 1, means for retracting solder from the soldering tip operate as follows: With the trigger at position A, the return spring 9, is precompressed a predetermined amount between the rear wall 14 of the flange housing and the spring compression disc 15 which is attached to the feed tube. During the solder feed process previously described, the return spring 9 is further compressed by forward motion of the feed tube 2. After the solder joint is completed, force on the trigger 7 is reduced and the return spring force is translated to the flexible tension member 8 which, in turn, applies force to the trigger 7, moving it towards the undepressed position. As the feed tube initially retracts, the solder is retracted from the soldering tip by the unopposed rearward acting force exerted on the solder by the teeth 3 on the feed tube tines. The solder, in turn, retracts the restraint tube 5 through solder engagement with the teeth 4 on the restraint tube tines. When the restraint tube is returned to the point where the flange 11 come into contact with the rear wall 14 of the flange housing, position AB, further rearward movement of the restraint tube is prevented by this stop means. At this point, because of the configuration of the teeth on the tines of the feed and restraint tubes, as previously described, the restraint tube prevents the solder from further rearward movement, while the feed tube returns to its original position, the teeth 3 on the feed tube tines sliding over the solder. The function of the restraint tube is to allow the feed tube to retract the solder a predetermined distance from the soldering tip upon release of the trigger, but then to prevent further rearward motion of the solder while the feed tube returns to its original position for another feed cycle.

After the feed tube arrives at its original position, complete release of the trigger breaks electrical contact to the heating element, completing the heaing cycle. The solder feed-retract cycle functions as described herein regardless of the degree of trigger depression beyond position C. Full depression of the trigger is not required to completely cycle the feed mechanism. Any desired amount of solder may be fed to the soldering tip by incremental trigger depression beyond position C, and the retract cycle will operate upon release of the trigger from such incrementally depressed position.

When the solder within the mechanism is nearly consumed by repeated soldering actions, the last increment is expelled from the teeth of the restraint tube and the solder loading process is repeated.

DESCRIPTION OF THE PREFERRED EMBODIMENTS

Figure 3:
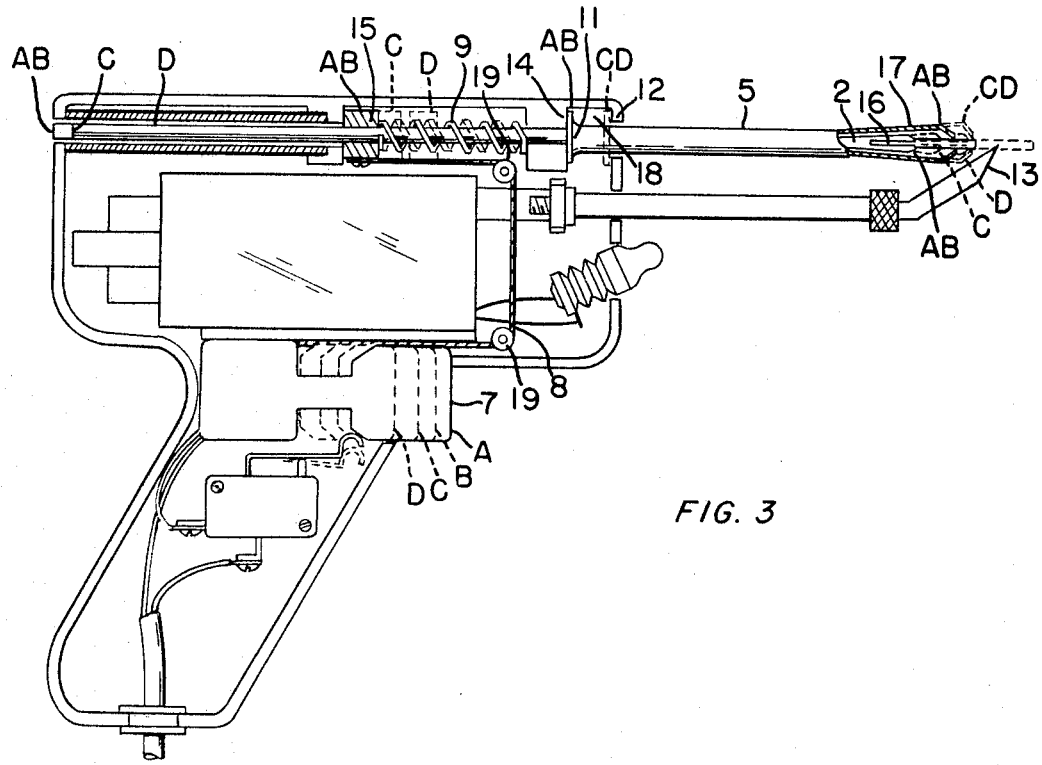
FIGURE 3 is a side elevation of a complete soldering gun with a conductively heated tip incorporating our novel feed mechanism.
Figure 4:
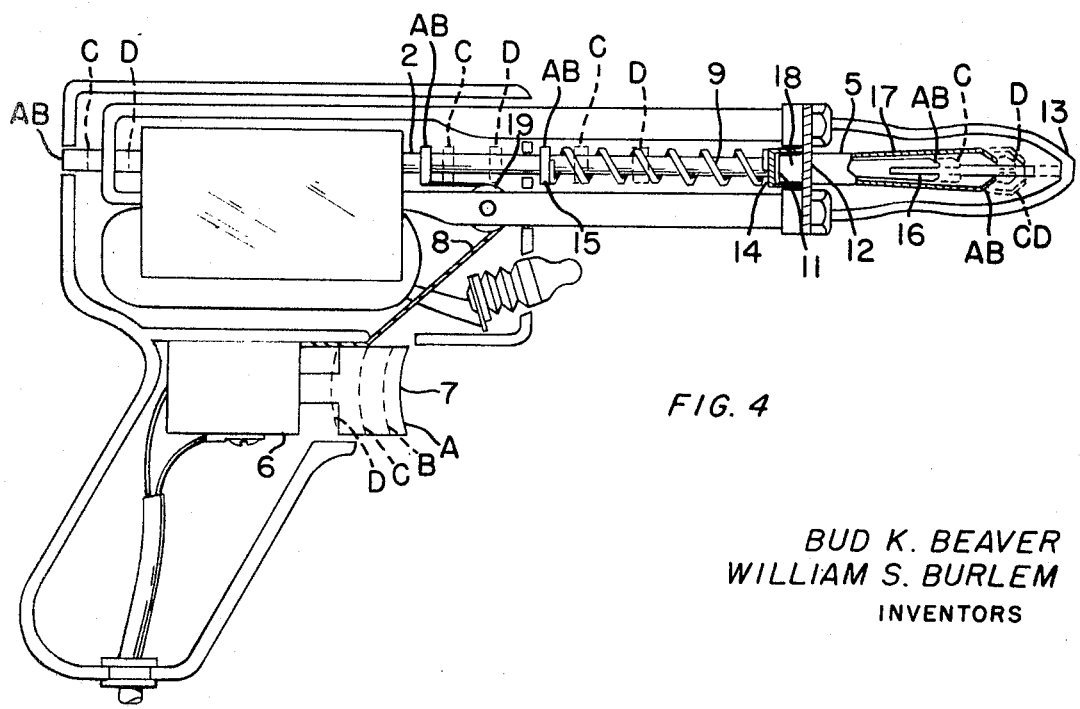
FIGURE 4 is a side elevation of such a soldering gun except that the tip is current-heated, rather than conductively heated.

The solder feed mechanism herein described is not restricted in application to any particular configuration of pistol-type electric soldering tools. FIGURE 3 illustrates incorporation of the mechanism into a tool with a conductively heated soldering tip. The mechanism is located in the housing above the transformer assembly and the flange housing for the restraint tube flange is an integral part of the gun housing. The mechanism is equally adaptable to the current-heated tip where the tip is an integral part of the transformer secondary winding, as shown in FIGURE 4. In this example, the feed tube extends through the transformer core laminations and the flange housing for the restraint tube flange is supported between the secondary electrodes. The preceding description of operation is applicable to both of these illustrations.

What we claim and desire to be secured by Letters Patent is:

1. In combination with an electric soldering gun, a solder feed and retraction mechanism comprising:
    (a) a trigger attached to one end of
    (b) a flexible tension member which is diverted over
    (c) guide means
    (d) solder feed means attached to the opposite end of said flexible tension member
    (e) a spring which creates a force on said solder feed means in a direction opposite to the force created thereon by the flexible tension member
    (f) solder restraining means which limits the distance of solder withdrawal from the tip by abutting
    (g) a flange housing rigidly attached to the soldering gun.

2. A solder feed and retraction mechanism as claimed in claim 1 wherein the solder restraining means is positioned in a circular space relationship with respect to the solder feed means whereby their motions are coupled only by the solder wire.

3. A solder feed and retraction mechanism as claimed in claim 1, wherein the only radial forces on the solder wire are resilient forces created by outward deflection of the solder feed means and solder restraining means.

4. A solder feed and detraction mechanism as claimed in claim 1, wherein the solder restraining means comprises:
    (a) a restraint tube, larger in diameter and concentric with the feed means and
    (b) resilient tines at one end of the restraint tube and integral therewith
    (c) a pluarlity of teeth, integral with and protruding inwardly from said tines, and positioned in circular relationship to each other.

(d) stop means on the restraint tube (e) restricting means secured to the solder gun structure and abutting the stop means on the restraint tube.

5. In combination with an electric soldering gun, including a solder feed and retraction mechanism, the improvement in the feed mechanism which consists of providing a flexible tension member to couple the trigger to the solder feeding means.

6. In combination with an electric soldering gun, a solder feed mechanism comprising a trigger which is connected to one end of a flexible tension member which is diverted over one or more guides, with the opposite end of said flexible tension member connected to the solder feeding means.

7. In combination with an electric soldering gun, a feed mechanism as claimed in claim 6, the solder feeding means comprising:

(a) a feed tube (b) resilient tines at one end of said tube and integral therewith (c) a plurality of teeth, integral with and protruding inwardly from said tines and positioned in circular relationship to each other.

8. In combination with an electric soldering gun, a solder retraction mechanism comprising:

(a) solder feeding means as claimed in claim 7

(b) a spring which exerts a force on the solder feeding means in a direction away from the soldering gun tip.

References Cited

UNITED STATES PATENTS

| | | | |
|---|---|---|---|
| 3,190,525 | 6/1965 | Bellamy | 228—53 |
| 3,171,374 | 3/1965 | Frenzel | 228—53 |
| 1,951,441 | 3/1934 | Rock | 228—53 |
| 1,871,009 | 8/1932 | Righter | 228—53 |

RICHARD H. EANES, JR., *Primary Examiner.*